United States Patent Office 2,932,649
Patented Apr. 12, 1960

2,932,649

2-THIOCYANOMETHYL BENZOTHIAZOLE AND CORRESPONDING 5-CHLOROBENZOTHIAZOLE AND BENZOXAZOLE

Jean Metivier, Arpajon, France, assignor to Societe des Usines Chimiques Rhone-Poulenc, Paris, France, a corporation of France No Drawing. Application September 10, 1958
Serial No. 760,087

4 Claims. (Cl. 260—304)

This invention relates to new thiocyanic esters and to a process for their preparation, and includes pesticidal compositions containing the same.

According to the present invention there are provided new thiocyanic esters conforming to the general formula:

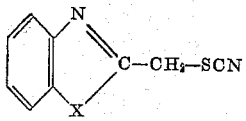

(I)

wherein X represents an oxygen or sulphur atom and the fused benzene nucleus may contain one or more substituents in the form of halogen atoms, more especially chlorine and bromine, alkyl and alkoxy groups containing from 1 to 4 carbon atoms, and nitro groups.

According to a feature of the invention the new esters are obtained by reacting a benzoxazole or benzthiazole of the general formula:

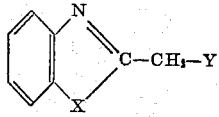

(II)

(wherein Y represents the acid residue of a reactive ester, such as a halogen atom (preferably chlorine or bromine) or a sulphuric or sulphonic ester residue, more especially the p-toluene-sulphonic residue, X is as hereinbefore defined, and the fused benzene nucleus may be substituted by one or more atoms or groups as mentioned above) with a metal thiocyanate, and more particularly an alkali metal thiocyanate.

The reaction may be carried out at room temperature, but it is preferred to effect it at a moderate temperature to accelerate the reaction. The reaction is preferably carried out in an inert organic solvent, for example in an aromatic hydrocarbon such as benzene or toluene, a halogenated aliphatic or aromatic compound such as chlorobenzene, an ether such as anisole, or a ketone such as acetone or methyl ethyl ketone.

The new esters of the present invention have been found to possess important pesticidal, and more especially fungicidal, properties. By virtue of their fungicidal properties, they may be employed for the prevention and treatment of plant diseases (in particular, they are effective against Oidium), for the prevention of the development of mould in industrial products, and for the prevention and treatment of animal mycoses.

They may be utilised in any of the physical forms in which pesticidal materials are customarily used, usually in association with one or more compatible diluents. The present invention accordingly includes within its scope a pesticidal composition containing at least one compound of the general Formula I and at least one diluent compatible therewith. The composition may be provided in solid form by employing a diluent in the form of a powder compatible solid such as talc, a clay, for example kaolin or bentonite, limestone, calcined magnesia, kieselguhr, tricalcium phosphate, or cork powder, the thiocyanic ester preferably being present in an amount of from 0.005 to 5% based on the weight of the composition. Instead of a solid, there may be employed a liquid in which the thiocyanic ester is dissolved or dispersed, preferably in an amount of from 0.005 to 0.1% based on the weight of the composition. Thus the composition may be provided in the form of an aerosol or a suspension, emulsion, or solution in an organic or aqueous-organic medium, for example an aromatic hydrocarbon such as toluene or xylene, or a mineral or animal or vegetable oil or a mixture of such media. Compositions in the form of dispersions, solutions or emulsions may contain a wetting, dispersing or emulsifying agent of the ionic or non-ionic type, for example sulphoricinoleates, alkyl sulphonates, quaternary ammonium derivatives or products based on ethylene oxide condensates such as condensates of ethylene oxide with octylphenol or fatty acid esters of anhydrosorbitols which have been solubilised by etherifying the free hydroxyl groups with ethylene oxide. Agents of the non-ionic type are preferred since they are not affected by electrolytes. When use of emulsions is contemplated, the thiocyanic esters may be formulated as a self-emulsifying concentrate containing the active substance dissolved in the dispersing agent or in a solvent compatible with that dispersing agent, the compositions being made ready for use by the simple addition of water.

Compositions of solid form are preferably prepared by crushing the thiocyanic ester with the solid diluent, or by impregnating the solid diluent with a solution of the thiocyanic ester in a volatile solvent, driving off the solvent and, if necessary, crushing the product to form a powder.

The new compounds may be employed in admixture with other pesticides including substances resulting in a synergistic effect. The following examples illustrate the invention. The melting points were determined on the Kofler bench.

*Example I*

A mixture of 32 g. of 2-hydroxymethylbenzthiazole p-toluene sulphonate, 14.5 g. of potassium thiocyanide and 500 cc. of acetone is agitated for 40 minutes at ambient temperature. After refluxing for ½ hour, the precipitate formed is filtered off and the acetone is driven off under reduced pressure with heating at 40–50° C. The residue obtained is taken up in 250 cc. of benzene and washed with water (5 x 50 cc.).

After treatment with decolorising charcoal, the benzene solution is concentrated until crystallisation commences. The crystals obtained are filtered off and dried. On recrystallisation from benzene, 18.1 g. of 2-thiocyanomethylbenzthiazole, M.P. 88–89° C., are obtained.

*Example II*

A mixture of 10.7 g. 2-hydroxymethyl-5-chlorobenzthiazole p-toluenesulphonate, 4.4 g. of potassium thiocyanide and 160 cc. of acetone is agitated for 45 minutes. After heating under reflux for 25 minutes, insoluble matter is filtered off and the acetone solution is concentrated under a pressure of 20–30 mm. Hg with heating at 40–50° C. The solid residue obtained (9.0 g.) is washed with 50 cc. of water; a solid weighing 7.2 g. remains. On crystallisation of the solid from 25 cc. of ethyl alcohol, 5.6 g. of 2-thiocyanomethyl-5-chlorobenzthiazole, M.P. 105° C., are obtained.

The 2-hydroxymethyl-5-chlorobenzthiazole p-toluenesulphonate employed as starting material, M.P. 130° C., is prepared by the action of p-toluenesulphonyl chloride on 2-hydroxymethyl-5-chlorobenzthiazole.

The last mentioned compound is prepared by the action of glycolic acid on 4-chloro-2-aminothiophenol hydrochloride in the presence of a quantity of potassium ethoxide sufficient to liberate the base from its salt. After distillation of the liberated ethyl alcohol, the reaction mixture is heated at 148–150° C. for 3 hours. There is thus obtained 2-hydroxymethyl-5-chlorobenzthiazole which melts at 112–115° C.

Example III

A mixture of 24.3 g. of 2-hydroxymethylbenzoxazole p-toluenesulphonate, 9.3 g. of potassium thiocyanide and 280 cc. of acetone is agitated for 2 hours at ambient temperature. After refluxing for 30 minutes, the salt formed is filtered off and the filtrate is concentrated under a pressure of 30–40 mm. Hg with heating at 40–50° C. The oily residue obtained crystallises on cooling. The solid is washed with water and dried in vacuo over sulphuric acid. It weighs 15.1 g.

After two crystallisations from ethyl alcohol, there are obtained 8.6 g. of 2-thiocyanomethylbenzoxazole melting at 66–67° C.

The 2-hydroxymethylbenzoxazole p-toluenesulphonate, M.P. 91° C., employed as starting material is prepared by reacting p-toluenesulphonyl chloride with 2-hydroxymethylbenzoxazole in the presence of potassium hydroxide.

The 2-hydroxymethylbenzoxazole is prepared by the action of glycolic acid on o-aminophenol in an analogous manner to that described in Example II for the preparation of 2-hydroxymethylbenzthiazole. After crystallisation from benzene, it melts at 61° C.

Example IV 100 g. of 2-thiocyanomethylbenzthiazole are intimately mixed with 100 g. of talc. The powder thus obtained is suspended in water at the rate of 200 g. to 100 litres of water, and the mixture thus prepared is used for the treatment of apple trees against Oidium.

Example V 100 g. of 2-thiocyanomethylbenzoxazole is finely ground with 90 g. of water and 10 g. of a condensation product of ethylene oxide and octyl phenol. The paste thus obtained is dispersed in 100 litres of water, and this dispersion is used for the same purpose referred to in Example IV.

I claim:
1. 2-thiocyanomethylbenzthiazole.
2. 2-thiocyanomethyl-5-chlorobenzthiazole.
3. 2-thiocyanomethylbenzoxazole.
4. Thiocyanic esters selected from the class consisting of compounds of the general formula:

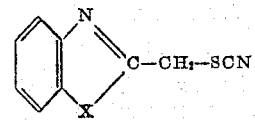

wherein X is selected from the group which consists of oxygen and sulphur atoms.

References Cited in the file of this patent

Kirner et al.: Chem. Abstracts, vol. 23, p. 5472 (1929).
Levi: Chem. Abstracts, vol. 26, p. 118 (1932).
Harris: Chem. Abstracts, vol. 43, col. 3964 (1949).
Frear et al.: J. of Economic Entomology, vol. 40, pp. 736–41 (1947).